United States Patent Office 3,657,148
Patented Apr. 18, 1972

3,657,148
ALKYLATION CATALYST COMPLEX, ITS PREPARATION AND USE
Matthew L. Becker, Philadelphia, and Robert F. Chapman, Lafayette Hills, Pa., assignors to Atlantic Richfield Company, New York, N.Y.
No Drawing. Filed Oct. 23, 1969, Ser. No. 868,920
Int. Cl. C07c 3/56
U.S. Cl. 252—429                                  6 Claims

ABSTRACT OF THE DISCLOSURE

Alkylation catalyst complex and its method of preparation by reacting benzene and an alkylate fraction with aluminum chloride in the presence of anhydrous hydrogen chloride. The catalyst is particularly suitable for use in a process for the alkylation of an aromatic hydrocarbon.

BACKGROUND OF THE INVENTION

Field of the invention

The present invention relates to an alkylation catalyst complex, in particular to an aluminum chloride catalyst complex and its method of preparation. The invention also relates to the use of the aluminum chloride alkylation catalyst complex in a process for the alkylation of aromatic compounds with alkyl halides.

Prior art

The alkylation of aromatic hydrocarbons with alkyl chlorides in the presence of an aluminum chloride catalyst is well known. The resulting alkylated aromatics when sulfonated are useful as synthetic detergents. It is also known that the catalytic agent in such alkylation reactions is not solely the aluminum chloride but is a complex organic aluminum chloride material which is variously referred to as "red oil," "contact oil," "catalyst sludge" or "catalyst complex."

One of the methods for catalyst preparation, known and practiced commercially is to suspend the solid aluminum chloride in the aromatic compound or a solution thereof and gradually introduce the alkylation agent into the suspension. In such a process, the solid aluminum chloride slurry reacts to form a partially soluble organo-aluminum chloride catalyst complex and this material then promotes the desired reaction. In general, other known methods differ from this in only immaterial details.

The above methods suffer from the disadvantage that the concentration and activity of the catalyst are not constant but changes because the solid aluminum chloride continues to form the catalyst complex. This formation of catalyst complex is not a rapid reaction and consequently the catalyst preparation cited above when used in an alkylation process, results in wide fluctuations in product quality and processing because of the inability to control the activity of the catalyst complex. In addition, there are numerous mechanical difficulties attendent to the continuous feeding of solid anhydrous aluminum chloride or suspensions thereof to the alkylation zone which adds to the expense of the process. Also, the presence in the reaction mixture of unreacted solid aluminum chloride during the early stages of the reaction before the catalyst complex is completely formed tends to introduce undesirable side reactions, in particular, the formation of tar-like materials which markedly decrease the efficiency of the alkylation process. Moreover, when it is attempted to suspend the aluminum chloride in the aromatic hydrocarbon reactant there is frequently a residual amount of unreacted finely divided aluminum chloride which forms a troublesome sediment often clogging the reactor, piping, heat exchangers, pumps and associated equipment. Because of these and other disadvantages, the prior art processes for preparing aluminum chloride catalysts are not satisfactory.

The present invention provides a novel catalyst complex of uniform activity and a convenient process for producing said catalyst complex, whereby the catalyst is easy to handle and avoids completely all of the disadvantages of prior art.

SUMMARY OF THE INVENTION

According to the present invention, there is provided a novel alkylation catalyst complex and a method for its preparation, which method comprises the steps of reacting benzene and heavy alkylate or heart cut alkylate (both to be defined hereinafter) with aluminum chloride in the presence of anyhdrous hydrogen chloride. The alkylation catalyst complex thus formed, is a material which is easily handled and which has a suitable catalytic activity for the alkylation of aromatic hydrocarbons such as benzene with alkyl halides, in particular alkyl chlorides. The alkylation catalyst complex prepared as described is charged to an alkylation zone along with an aromatic hydrocarbon preferably benzene and an alkyl halide under conditions for alkylating the aromatic with the alkyl halide. The catalyst provides smooth, close control of the alkylation process without excessive by-product formation or troublesome mechanical problems. The alkyl aromatic produced, is separated from the catalyst complex, unreacted hydrocarbons and alkyl halides and can thereafter be converted into an active detergent by sulfonation and neutralization to the desired salt.

It is an object of this invention therefore to provide a novel aluminum chloride alkylation catalyst complex.

It is another object of this invention to provide a method for the preparation of an aluminum chloride alkylation catalyst complex.

Other objects of this invention will be apparent to those skilled in this art from the description of the preferred embodiments which follows and from the claims.

DESCRIPTION OF THE PREFERRED EMBODIMENTS

This invention is particularly applicable to alkylation reactions involving the alkylation of benzene with chloroalkanes in particular monochloroalkanes having from 9 to 16 carbon atoms and preferably from 10 to 14 carbon atoms. Although the chloroalkanes may be straight or branched chain, present-day commercial plants, in highly industrialized countries, use almost exclusively straight chain chloroalkanes since these give a final alkylbenzene sulfonate detergent which is more readily biodegradable than the compounds obtained from branch chain chloroalkanes.

The term "heavy alkylate" as used herein refers to compounds boiling above the desired so-called heart cut alkylate used to produce the alkylbenzenesulfonate. The heavy alkylate contains a small quantity, generally less than about 10 weight percent, of the monoalkylbenzenes wherein the alkyl group is in the upper end of the molecular weight range corresponding to the chloroalkane used in the alkylation step. Thus, if chloroalkanes having a range of 9 to 16 carbon atoms are used, these monoalkylbenzenes will have 15 and 16 carbon atoms in the side chain. If a 10 to 14 carbon atoms fraction of chloroalkanes is employed these monoalkylbenzenes will have about 14 carbon atoms in the side chain. The remainder of the heavy alkylate fraction is composed of polyalkylated benzenes, each alkyl side chain having at least 10 carbon atoms when a $C_{10}$ to $C_{14}$ chloroalkane fraction is used or at least 9 carbon atoms when a $C_9$ to $C_{16}$ fraction is employed and in addition to the polyalkylated aromatics, is composed of polynuclear aromatics such as the diphenyl alkanes, wherein the radical joining the two phenyl groups is of the length corresponding to the chloroalkanes employed. Although obviously the physical properties of heavy alkylate will vary, a typical heavy alkylate has the following properties:

| | |
|---|---|
| Specific gravity | 0.878–0.890 |
| ASTM Distillation: | |
| IBP | 620° F. (min.) |
| 5% | 605° F. (min.) |
| 50% | 750° F. (avg.) |
| 90% | 800° F. (max.) |
| Bromine number | 2.0 (max.) |
| Aniline point | 140° F. (max.) |

The "heart cut" alkylate fraction as the name implies is that fraction composed predominantly of monoalkylbenzenes having side chains of the desired length and thus boiling in the center portion of the product boiling range. Thus if a $C_9$ to $C_{16}$ chloroalkane is used to alkylate benzene, the heart cut will contain only very minor amounts of the monoalkylbenzenes having $C_9$ and $C_{16}$ alkyl groups, larger amounts of the monoalkylbenzenes having the $C_{10}$ and $C_{15}$ alkyl groups, with the largest fraction being in the $C_{11}$ to $C_{14}$ alkyl group range. If a $C_{10}$ to $C_{14}$ chloroalkane fraction is employed, the heart cut will contain only small amounts of monoalkylbenzenes having $C_{14}$ alkyl groups, but large amounts of the monoalkylbenzenes having $C_{10}$, $C_{11}$, $C_{12}$ and $C_{13}$ alkyl groups.

Since the fractionation to obtain the $C_{10}$ to $C_{14}$ chloroalkanes is not completely efficient, there will be a small amount of alkylbenzenes with $C_9$ and shorter side chains. A typical heart cut has the following composition:

| Carbons in side chain: | Wt. percent |
|---|---|
| 9 and 9 | 0.6 |
| 10 | 22.3 |
| 11 | 33.7 |
| 12 | 28.4 |
| 13 | 14.8 |
| 14 | 0.2 |

The catalyst complex is formed by the interaction of either heart cut alkylate or heavy alkylate and benzene with the aluminum chloride and anhydrous hydrogen chloride. The catalyst complex in general contains from about 30 weight percent to about 50 weight percent of aluminum chloride, based on the weight of the total complex. A preferred range is from about 30 weight percent to about 45 weight percent.

The catalyst complex is prepared by adding aluminum chloride in granular, powdered or other suitable form to a liquid body of the alkylate and benzene, and thereafter bubbling anhydrous hydrogen chloride through the hot mixture for a period of time sufficient to cause the substantially complete solubilization of the aluminum chloride whereby substantially single phase catalyst complex is formed. The weight ratio of benzene to alkylate (heart cut or heavy) can range from 4:1 to 1:4 with a somewhat more preferred range being from 1:1 to 1:2.5.

The vessel employed for producing the complex is preferably provided with baffles and highly efficient mixing means such as paddles, stirrers, or the like. It is essential in the method of this invention that there be sufficiently vigorous mixing to maintain the alkylate and the aluminum chloride in intimate contact during the period of time that the catalyst is being prepared. Insufficient mixing will allow the aluminum chloride to settle to the bottom of the vessel and produce a viscous tarry solid rather than active fluid catalyst complex. Suitable means are also provided for introducing the alkylate, benzene, aluminum chloride and anhydrous hydrogen chloride to the catalyst preparation vessel.

The catalyst complex formation is effected at a temperature within the range of from about 150° F. to 250° F. and preferably in the range of from about 170° F. to about 200° F. The reaction is usually carried out at atmospheric pressure although it can be carried out at lower or higher pressures.

The invention has been described for preparing an aluminum chloride complex catalyst although it will be obvious that it is equally applicable for the preparation of aluminum-bromide and similar aluminum halide catalysts. Such catalysts, however, because of their expense are not ordinarily used in commercial alkylation processing and therefore the invention has been directed to aluminum chloride. Similarly, aromatic hydrocarbons other than benzene can be alkylated with the catalyst of this invention, although, in general the vast majority of commercial alkylation processes are concerned with alkylating benzene. These other aromatic which can be alkylated by the catalyst of this invention include toluene, ethylbenzene, the xylenes, naphthalene and the like. In addition, although the catalyst of this invention can be employed for the alkylation of aromatics with haloalkanes, it is equally applicable to the alkylation of aromatics with olefins in accordance with well-known commercial practices.

The haloalkanes are obtained in accordance with well-known commercial methods. A petroleum fraction containing paraffins, in particular straight chain paraffins, is passed through a bed of molecular sieves in order to obtain the straight chain compounds in accordance with commercial practice. Alternatively, urea adduction can be used to separate the straight chain compounds. The straight chain paraffins, in the desired molecular weight range, are then monochlorinated by use of gaseous chlorine to a conversion of generally less than about 20 percent, i.e. only 20 percent of the paraffins are chlorinated. Under these conditions the chlorinated paraffins are primarily the monochloro compounds with only a small amount of di- and polychlorinated compounds, generally less than 10 weight percent of the chlorinated products, being obtained. The chlorinated paraffin fraction is ordinarily used as the alkylating agent without separating the unreacted paraffins, which after the alkylation reaction are separated and recycled to the chlorination step. Accordingly, the catalyst of this invention can be utilized in an alkylation process in which the alkylating agent is the above-described chlorinated paraffin-paraffin mixture.

It is preferred that the alkylate-aluminum chloride catalyst complex, which is charged to the alkylation reaction, be a single phase material. If desired, however, a two-phase material comprising at least 30 weight percent heavy alkylate aluminum chloride catalyst complex can be charged to the reaction zone. In general, considerable latitude can be exercised in the choice of amounts of reactants and conditions in the alkylation reaction. Thus, the chlorinated paraffin-paraffin mixture can range from about 20 weight percent to 80 weight percent based on the reaction mixture, the benzene or other aromatic can range from 20 weight percent to 80 weight percent based on the reaction mixture and the aluminum chloride catalyst complex can range from 1 weight percent to 10 weight percent based on the reaction mixture.

The alkylation temperature can be in the range of from about 120° F. to 250° F. or higher but is preferably in the range of from about 150° F. to 220° F. The reaction is conducted at atmospheric pressure or pressures somewhat above atmospheric, although lower pressures can also be used. The alkylation reaction is carried out in any type of suitable reactor either in a continuous or batchwise manner, but, in general, it is carried out in a continuous manner in accordance with practices well-known in the alkylation art.

In the alkylation plant, the pre-formed catalyst complex of this invention together with the alkylating agent such as the chloroparaffin-paraffin mixture and aromatics, such as benzene, are introduced into a reactor maintained at the desired temperature. The contact time in the reactor can vary in the range of from about 5 minutes to 60 minutes but in general ranges from about 5 to 15 minutes. The time required for effecting the desired alkylation, is a function of a large number of operating variables, and therefore is chosen in accordance with these variables.

The following examples are provided for the purpose of illustrating the invention, but these should not be construed as limiting the invention solely to their disclosure.

EXAMPLE I

Five runs were carried out using various quantities of reactants and procedures. The data for these runs are shown in the table below.

In Runs 1 to 3 the liquids (alkylate and benzene) were charged to a 500 ml. flask equipped with a stirrer, a reflux condenser and a gas inlet tube. The heart cut alkylate and heavy alkylate corresponded to the typical fractions described hereinbefore. The flask was then purged with dry nitrogen. The aluminum chloride was weighed out into screw-topped vials in a dry box. Twenty grams was added to the liquid mixture and stirred for 30 minutes at 178°–183° F. (reflux temperature).

It was found that no discernable amount of the aluminum chloride had dissolved. At the end of the 30 minutes, therefore, hydrogen chloride gas was introduced from a weighed bomb at a very slow rate and stirring continued. In all three runs complete solution of the aluminum chloride occurred within 30 to 60 minutes. The aluminum chloride complex was then drawn off and weighed and a second addition of 20 grams of aluminum chloride was made to the remaining oil layer in the flask.

In Run 1 only one-half of the second increment dissolved. In Run 2, all of the second increment dissolved, but solution of the last traces required several hours so no additional aluminum chloride was added. In Run 3 the second 20 grams dissolved in 1¾ hours so a third increment of 20 grams of aluminum chloride was added, but only a small amount (about 10 percent or 2 grams) of this dissolved.

It will be seen from these runs that, although heart cut alkylate can be used, with increasing amounts of heavy alkylate, there was increased complex formation and rate of solution. It is also apparent from these runs that at the high benzene to alkylate ratios there is a considerable amount of free oil in the product. Accordingly, Run 4 was made with 1 part by weight of benzene to 2 parts by weight of the heavy alkylate. Aluminum chloride was added, starting with a 50 gram addition followed by nine 10 gram additions without removal of the complex between additions. The ninth increment did not dissolve completely but there was no incomplexed oil remaining. The complex was very viscous and it was calculated to contain about 55 weight percent aluminum chloride, which is slightly higher than the preferred upper limit of about 50 weight percent.

Run 5 was made by adding all of the reactants at once— 1 part by weight of benzene, 2 parts by weight of heavy alkylate and 2 parts by weight of the anhydrous aluminum chloride. Complete solution was achieved in 8 hours at 200° F. with 10 grams of hydrogen chloride bubbled through the mixture.

TABLE

| | Material charged, gms. | | | | | Product | | | |
|---|---|---|---|---|---|---|---|---|---|
| Run No. | Heart cut $C_{10}$–$C_{13}$ | Heavy alkylate | Benzene | $AlCl_3$[1] | HCl | Complex, gms. | Free oil, gms. | Calc., percent $AlCl_3$ | Activity, percent |
| 1 | 64 | | 200 | 30 | 7 | 74.5 | 200 | 40 | 94.5 |
| 2 | 57 | 8 | 200 | 40 | 16 | 116.2 | 190 | 35 | 91.0 |
| 3 | | 66 | 200 | 42 | 14 | 153.8 | 150 | 27 | 31.0 |
| 4 | | 89 | 44 | 130 | 15 | 234 | 0 | 55 | |
| 5 | | 140 | 70 | 140 | 10 | [2]315 | Trace | 44 | 98.8 |

[1] Excess $AlCl_3$ charged in Runs 1–4. Amount dissolved estimated.
[2] 35 grams of material were lost as equipment hold-up.

It will be noted that the product in Runs 4 and 5 were single phase heavy alkylate-aluminum chloride complexes wherein there was no free oil present.

The activity of the catalyst complexes in Runs 1, 2, 3 and 5 was measured by taking a sample of the complex in a manner whereby exposure to air was avoided. The samples were taken into nitrogen purged bottles without exposure to the atmosphere and were prevented from deactivation through exposure to the air by being kept tightly sealed with a serum cap. Samples were taken from the bottles through the serum cap with a syringe.

To a 100 ml., four-necked flask was charged 50 ml. of a pre-dried mixture of benzene, 1-chlorododecane and n-dodecane. The mixture is stirred at a precise rate and heated to reaction temperature (200° F.) and 1 ml. of the liquid aluminum chloride catalyst complex is added. The reaction mixture has the composition:

benzene/1-chlorododecane: 5/1 volume ratio
dodecane/1-chlorododecane: 9/1 volume ratio
catalyst complex/1-chlorododecane: 0.3/1 volume ratio One minute after the addition of the liquid aluminum chloride complex to the reaction mixture, a sample of the reaction mixture is taken (approximately 15 ml.) and immediately injected into a bottle containing 10 to 15 ml. of water in order to quench the reaction. The water-hydrocarbon mixture is allowed to settle and the hydrocarbon layer is sampled and analyzed by gas chromatography to determine the quantity of 1-chlorododecane which has been converted, i.e. which has reacted. This quantity in percent is designated as the activity of the catalyst.

It was found that the activities for Runs 1, 2, 3, and 5 were, respectively, 94.5 percent; 91.0 percent; 31.0 percent and 98.8 percent. The activity, it will be noted, is directly related to the amount of aluminum chloride in the complex and that the most desirable activities were obtained when the complex contained between about 35 percent and about 50 percent of aluminum chloride.

EXAMPLE II

In a commercial detergent alkylate plant, catalyst complex was prepared in accordance with the method of this invention. There was charged to a reaction vessel which had been purged with nitrogen 1100 gallons of heavy alkylate (substantially of the specifications set forth hereinbefore) and 700 gallons of benzene, the water content of the mixture being less than about 150 p.p.m. by weight. To this mixture was added 8800 pounds of anhydrous aluminum chloride with continuous vigorous mixing. The mixture was heated to about 200° F. to 230° F. while maintaining the pressure at about 15 p.s.i.g. Hydrogen chloride was introduced at a rate of from 140 to 180 standard cubic feet per hour. After four hours, the mixing and hydrogen chloride was stopped and the mixture was allowed to settle. In those batches wherein the aluminum chloride was found to be not completely dissolved, additional mixing and hydrogen chloride addition were employed until all of the aluminum chloride was dissolved. If a particular batch was found to have an activity below about 80 percent additional aluminum chloride was added to the next batch so that the composite of all the batches had a satisfactory activity.

This method of producing the catalyst was found to be completely satisfactory on a commercial scale and permitted a smooth and trouble-free operation of an alkylation plant, wherein straight chain $C_{10}$ to $C_{14}$ monochloroalkanes were employed to alkylate benzene.

We claim:

1. A process for the production of a catalyst complex suitable for the alkylation of aromatic hydrocarbons with chloralkanes or monoolefins which consists essentially of reacting benzene and an alkylated aromatic fraction with aluminum chloride in the presence of anhydrous hydrogen chloride, said reaction being carried out at a temperature of from 150° F. to 250° F. and, wherein the weight ratio of benzene to alkylated aromatic fraction is in the range of from 4:1 to 1:4, aluminum chloride ranges from 30 weight percent to 50 weight percent based on the weight of the total catalyst complex, and said alkylated aromatic fraction is selected from the group consisting of an alkylated benzene, wherein the alkyl group contains from 9 to 16 carbon atoms in the alkyl group and a heavy alkylate fraction resulting from the alkylation of benzene with a chloralkane or monoolefin, and said heavy alkylate having a boiling range of from about 620° F. to about 800° F.

2. The method according to claim 1 wherein the alkylated aromatic fraction is an alkylated benzene wherein the alkyl group contains from 9 to 16 carbon atoms.

3. The method according to claim 1 wherein the alkylated aromatic fraction is a heavy alkylate fraction resulting from the alkylation of benzene with a chloralkane or monoolefin and wherein said heavy alkylate has a boiling range of from 620° F. to about 800° F.

4. The method according to claim 1 wherein the reaction is carried out at a temperature of from 170° F. to 200° F.

5. The method according to claim 1 wherein the weight ratio of benzene to alkylated aromatic fraction is in the range of from 1:1 to 1:2.5 and the aluminum chloride ranges from about 30 weight percent to 45 weight percent based on the weight of the total catalyst complex.

6. The catalyst complex prepared in accordance with the process of claim 1.

References Cited

UNITED STATES PATENTS

| 3,448,161 | 6/1969 | Garcia | 260—671 R |
|---|---|---|---|
| 3,355,508 | 11/1967 | Moulden | 260—671 B |
| 3,478,118 | 11/1969 | Sorgenti | 260—671 B |

PATRICK P. GARVIN, Primary Examiner

U.S. Cl. X.R.

260—671 B